United States Patent
Tsuei et al.

(10) Patent No.: US 10,209,581 B2
(45) Date of Patent: Feb. 19, 2019

(54) DISPLAY PANEL HAVING STABLE MAINTENANCE RATIO WITH VIEWING ANGLE CHANGED IN DIFFERENT GRAY LEVELS

(71) Applicant: Innolux Corporation, Chu-Nan, Miao-Li County (TW)

(72) Inventors: Bo-Chin Tsuei, Chu-Nan (TW); Hsia-Ching Chu, Chu-Nan (TW); Kuei-Ling Liu, Chu-Nan (TW)

(73) Assignee: INNOLUX CORPORATION, Chu-Nan, Miao-Li County (TW)

( * ) Notice: Subject to any disclaimer, the term of this patent is extended or adjusted under 35 U.S.C. 154(b) by 262 days.

(21) Appl. No.: 15/203,723

(22) Filed: Jul. 6, 2016

(65) Prior Publication Data

US 2017/0032748 A1 Feb. 2, 2017

(30) Foreign Application Priority Data

Jul. 31, 2015 (TW) .............................. 104124884 A

(51) Int. Cl.
G09G 3/36 (2006.01)
G02F 1/1335 (2006.01)
G02F 1/1343 (2006.01)

(52) U.S. Cl.
CPC .. *G02F 1/134363* (2013.01); *G02F 1/133512* (2013.01); *G02F 2001/134372* (2013.01); *G09G 3/3648* (2013.01); *G09G 2300/0452* (2013.01); *G09G 2320/028* (2013.01)

(58) Field of Classification Search
None
See application file for complete search history.

(56) References Cited

U.S. PATENT DOCUMENTS

2013/0242222 A1* 9/2013 Nishida ............. G02F 1/133753
349/43

* cited by examiner

*Primary Examiner* — David D Davis
(74) *Attorney, Agent, or Firm* — Rabin & Berdo, P.C.

(57) ABSTRACT

A display panel includes a liquid crystal layer positioned between first and second substrates. The first substrate comprises scan lines and data lines intersected to define pixel regions. Each pixel region comprises an electrode having two extending portions parallel to the extending direction of the data lines and one bending portion positioned between and connecting the two extending portions. A dark pattern including a first dark pattern and plural second dark patterns is generated when a light passes the pixel region. The first dark pattern is corresponding to the bending portion and parallel to the scan line. The second dark patterns correspond to the two extending portions. The first dark pattern has the first and second widths in the first (half of all gray levels) and second gray levels (maximum gray level), respectively. A ratio of the first width to the second width is 2.1 to 3.0.

16 Claims, 8 Drawing Sheets

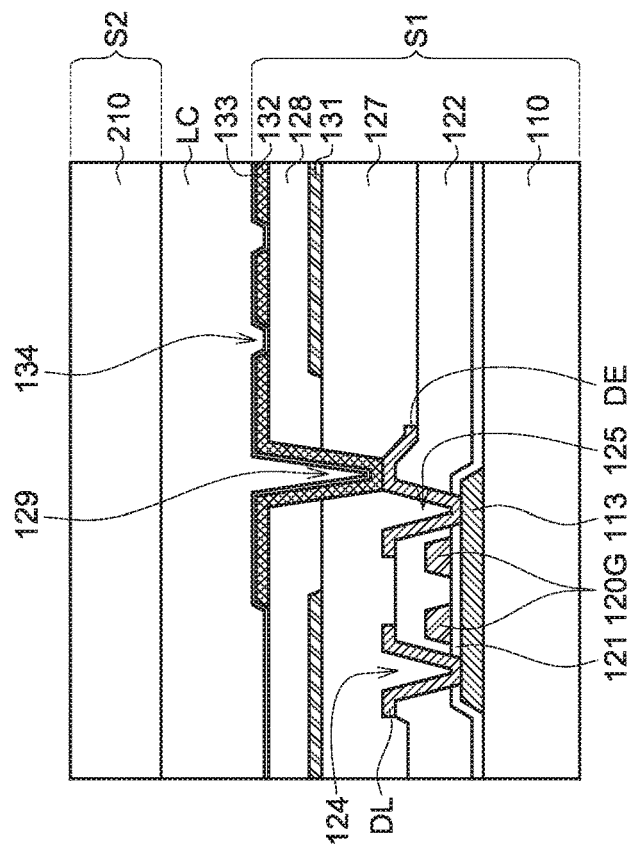
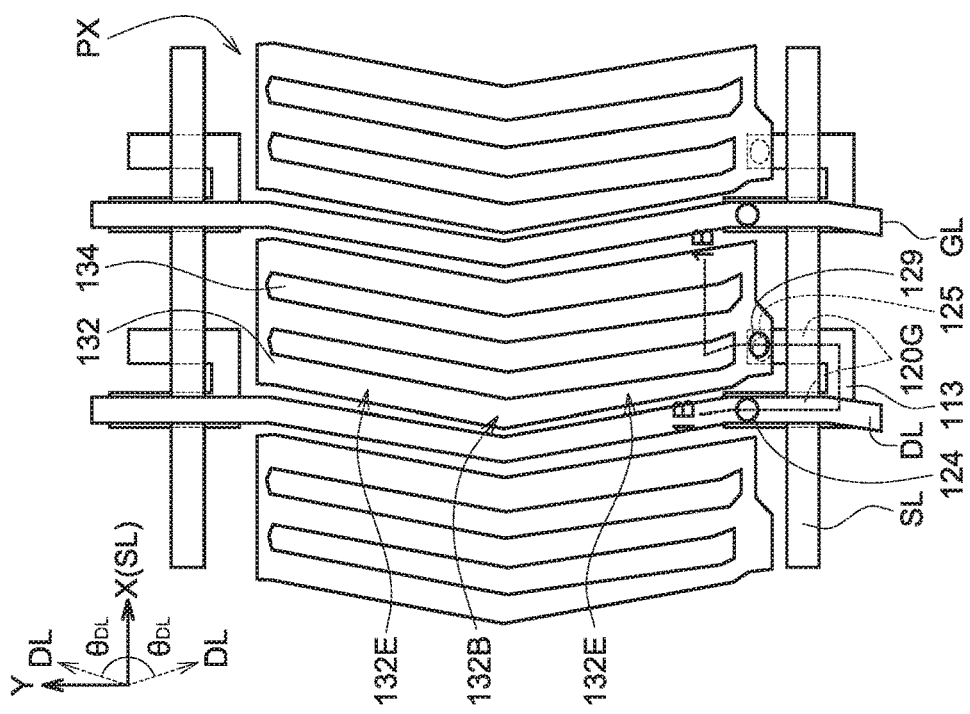
FIG. 1B
FIG. 1A

DISPLAY PANEL HAVING STABLE MAINTENANCE RATIO WITH VIEWING ANGLE CHANGED IN DIFFERENT GRAY LEVELS

This application claims the benefit of Taiwan application Serial No. 104124884, filed Jul. 31, 2015, the subject matter of which is incorporated herein by reference.

BACKGROUND

Field of the Invention

The disclosure relates in general to a display panel, and more particularly to a display panel having better displaying quality.

Description of the Related Art

Today, electronic products with display panels, such as smart phones, tablet personal computers (i.e. tablet PC, flat PC, ex: iPad), laptops, monitors, and televisions, are necessary tools for work and leisure in the daily life. Liquid crystal display (LCD) panel is the most popular display panel in use.

For a LCD panel applicable to a flat display, an electronic visual display and an image display, the liquid crystal molecules aligned between two transparent electrodes rotate continuously depending on the polarity and magnitude of the electric field when the electric field is applied, and different gray scale expression can be adjusted and realized by varying the applied voltage. LCD panel possesses the excellent characteristics such as compact in size, light weight, easy to carry, having reasonable price, higher display quality and operation reliability. Also, viewer's eyes feel much more comfortable looking at a LCD panel. Older cathode ray tube (CRT) monitors have been replaced by LCD panels. Currently, LCD panels provide a versatile choice in sizes, shapes and resolutions for the consumers. However, the quality of the display panel would be affected by the variations of the processes. It is important to consider not only the details in the manufacturing procedures, but also the electrical performances and specifications meeting the requirements of the product. For example, a qualified display panel should have better electrical characteristics such as high operation reliability and stable displaying quality, and the manufacturing method as provided has to obtain and maintaining the high production yield. Generally, the faulty design of the display panel will lead to the decreases of the yield and reliability of production. Moreover, the process variations effect on the electrical performances should be taken into consideration as well as the displaying quality.

SUMMARY

The disclosure is related to a display panel having better displaying quality.

According to one embodiment of the disclosure, a display panel is provided, comprising a first substrate, a second substrate opposite to the first substrate, and a liquid crystal layer disposed between the first substrate and the second substrate. The first substrate comprises scan lines disposed above the first substrate, and data lines disposed above the first substrate and intersecting with the scan lines to define pixel regions. At least one of the pixel regions comprises an electrode having two extending portions and one bending portion, wherein the extending portions are substantially parallel to an extending direction of the data lines, and the bending portion is positioned between the two extending portions and connects the two extending portions. When a light passes said one of the pixel regions, a dark pattern comprising a first dark pattern and plural second dark patterns is generated in said one of the pixel regions, wherein the first dark pattern is corresponding to the bending portion of the electrode, an extending direction of the first dark pattern is substantially parallel to an extending direction of the scan line, and the second dark patterns are corresponding to the extending portions of the electrode. The first dark pattern has a first width in a first gray level and a second width in a second gray level, and a ratio of the first width to the second width is in a range of 2.1 to 3.0, wherein the second gray level is a maximum gray level of the display panel, and the first gray level is equal to half of all gray levels.

The above and other aspects of the disclosure will become better understood with regard to the following detailed description of the preferred but non-limiting embodiments. The following description is made with reference to the accompanying drawings.

BRIEF DESCRIPTION OF THE DRAWINGS

FIG. 1A is a top view of a FFS (fringe filed switching) mode LCD panel according to an embodiment of the present disclosure.

FIG. 1B is a cross-sectional view of a LCD panel taken along the cross-sectional line 1B-1B of FIG. 1A.

DETAILED DESCRIPTION

Figure 2:
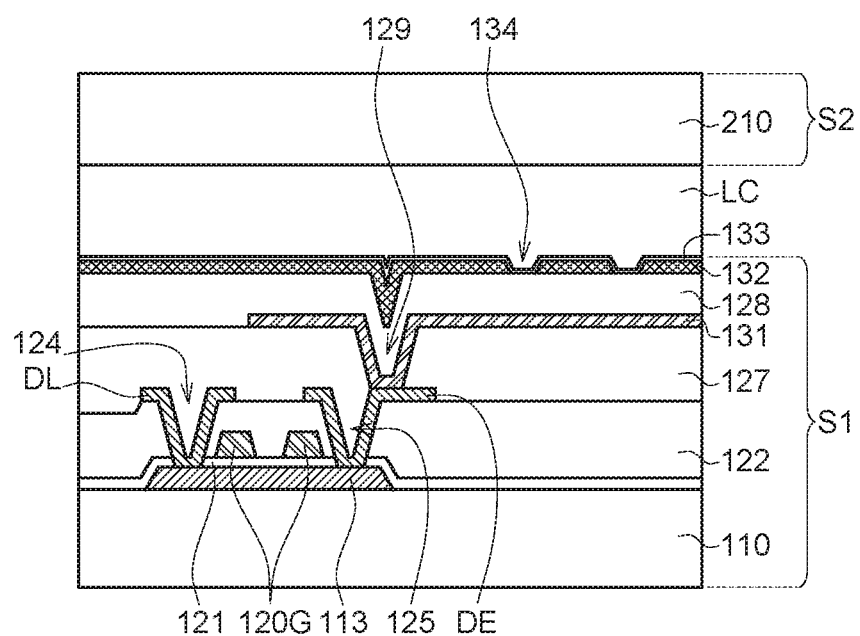
FIG. 2 is a cross-sectional view of a FFS (fringe filed switching) mode LCD panel according to another embodiment of the present disclosure.

In the embodiment of the present disclosure, a display panel having better displaying quality is disclosed by providing the particular design of the ratio of the widths in the different gray levels, thereby achieving the better stable maintenance ratio of luminous variation with viewing angle changed in different gray levels. Also, reducing the variations in manufacturing process affected by the result of stable maintenance ratio. Moreover, the display panels of the following embodiments provide higher aperture ratio to meet the design requirements of the products. Accordingly, the production yield of the display panel manufactured by the design of the embodiments is increased, and the more reliable and stable displaying quality of the embodied display panel is obtained consequently.

The embodiments are described in details with reference to the accompanying drawings. It is noted that the details of the structures of the embodiments are provided for exemplification, and the described details of the embodiments are not intended to limit the present disclosure. It is noted that not all embodiments of the invention are shown. Modifications and variations can be made without departing from the spirit of the disclosure to meet the requirements of the practical applications. Thus, there may be other embodiments of the present disclosure which are not specifically illustrated. Further, the accompany drawings are simplified for clear illustrations of the embodiment; sizes and proportions in the drawings are not directly proportional to actual products, and shall not be construed as limitations to the present disclosure. Thus, the specification and the drawings are to be regard as an illustrative sense rather than a restrictive sense. Also, the identical and/or similar elements of the embodiments are designated with the same and/or similar reference numerals.

Moreover, use of ordinal terms such as "first", "second", "third", etc., in the specification and claims to modify an element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The embodiment of the present disclosure can be widely used in different application fields, such as applied to a FFS (fringe filed switching) mode liquid crystal display (LCD) panel. FIG. 1A is a top view of a FFS (fringe filed switching) mode LCD panel according to an embodiment of the present disclosure. FIG. 1B is a cross-sectional view of a LCD panel taken along the cross-sectional line 1B-1B of FIG. 1A. A display panel includes a first substrate S1, a second substrate S2 disposed oppositely to the first substrate S1, and a liquid crystal layer LC disposed between the first substrate S1 and the second substrate S2. In this embodiment, a LCD panel having a top pixel electrode configuration is exemplified for illustration, but the disclosure is not limited to this configuration and illustrated details.

In one embodiment, the first substrate S1 comprises a first base 110, and a plurality of scan lines SL and data lines DL disposed above the first base 110 and intersecting each other, as shown in FIG. 1A. Also, two adjacent data lines DL and two adjacent scan lines SL intersect to define a pixel region PX. Also, the elements of the second substrate S2 have been omitted and not depicted in FIG. 1A.

As shown in FIG. 1A and FIG. 1B, the pixel region PX comprises a thin film transistor (TFT) including such as an active layer 113 made of LTPS (low temperature polysilicon) and disposed above the first base 110, a first insulating layer 121 disposed above the active layer 113, the gate 120G, and a second insulating layer 122 disposed above the gate 120G. In the embodiment, the TFT has double gates. The thin film transistor (TFT), functioning as a switch to control the pixel region PX, is disposed adjacent to the intersection between the scan line SL and the data line DL, and is electrically connected to the data line DL. Also, the second insulating layer 122 has the via 124 and the via 125, and the conductive material is disposed in the via 124 and the via 125 to form the data line DL and a drain electrode DE of the TFT, respectively. Examples of the conductive material include metal materials or other suitable conductive materials, such as ITO, IZO, ITZO, IGZO, or the combination thereof. Therefore, the data line DL is electrically connected to the active layer 113 through the via 124, and the drain electrode DE is electrically connected to the active layer 113 through the via 125. Additionally, a third insulating layer 127 disposed above the second insulating layer 122, the data line DL and the drain electrode DE. A first conductive layer 131 (not depicted in FIG. 1A) is disposed above the third insulating layer 127, a second conductive layer 132 disposed above the first conductive layer 131, a fourth insulating layer 128 disposed between the first conductive layer 131 and the second conductive layer 132, and an alignment film 133 disposed above the second conductive layer 132. As shown in FIG. 1B, according to the display panel of this embodiment, the configuration shows the second conductive layer 132 on the top being electrically connected to the data line DL, wherein the second conductive layer 132 is referred to a pixel electrode, and the first conductive layer 131 is referred to a common electrode. Structure shown in FIG. 1B is also known as a LCD panel having a top pixel electrode configuration. Therefore, a via 129 penetrates the fourth insulating layer 128 (disposed between the first conductive layer 131 and the second conductive layer 132) and the third insulating layer 127 (disposed between the TFT and the first conductive layer 131) to expose the drain electrode DE, as shown in FIG. 1B. The second conductive layer 132 is disposed in the via 129 for electrically connecting the drain electrode DE, so that the second conductive layer 132 can be electrically connected to the data line DL by the active layer 113.

In one embodiment, the first insulating layer 121, the second insulating layer 122 and the fourth insulating layer 128 could be the inorganic insulating layers, which can be made of the same or different inorganic materials, such as independently selected from SiOx or SiNx or other applicable materials. The second insulating layer 122 and the fourth insulating layer 128 could be a single layer or multi-layers. The third insulating layer 127 could be an organic insulating layer, such as polyfluoroalkoxy (PFA), for being an planarization layer to isolate the TFT from the first conductive layer 131. In other embodiment, the third insulating layer 127 could be made of the material of the color filter layer, which is a COA (Color filter on array) embodiment having a color filter layer and the thin film transistor (TFT) on the same substrate. However, the disclosure is not limited thereto, and the third insulating layer 127 could be fabricated choosing other organic material, inorganic material, or a combination of organic and inorganic materials. In one embodiment, the first conductive layer 131 and the second conductive layer 132 are spaced apart a distance ranged from about 50 nm to about 700 nm. In one embodiment, if the third insulating layer 127 between the thin film transistor and the first conductive layer 131 is an organic insulating layer, and the first conductive layer 131 and the second conductive layer 132 are spaced apart a distance ranged from about 300 nm to about 700 nm, such as about 500 nm. In other embodiment, if the third insulating layer 127 between the thin film transistor and the first conductive layer 131 is an inorganic insulating layer, and the first conductive layer 131 and the second conductive layer 132 are spaced apart a distance ranged from about 50 nm to about 300 nm, such as about 150 nm to about 200 nm. It is noted that those numerical values as provided are disclosed merely for illustration, not for restriction.

Additionally, the electrode of the embodiment comprises a plurality of electrode branches and a plurality of slits, and each of slits is positioned between the adjacent electrode branches. As shown in FIG. 1A and FIG. 1B, the second conductive layer 132 (i.e. the electrode) has several slits 134, and the extending directions of the slits 134 are substantially parallel to the direction of the data lines DL. In one embodiment, each of the slits 134 may have (but not limited to) a width in a range of 1.5 μm to 4 μm. In one embodiment, each of the electrode branches may have (but not limited to) a width in a range of 1.5 μm to 4 μm. Additionally, the first conductive layer 131 may have no slit (as shown in FIG. 1B) or have slits, and the disclosure has no particular limitation thereto.

In some embodiments, the TFTs of the display panel could be configured as the top-gate structure, as shown in FIG. 1B. In other embodiments, the TFTs of the display panel could be configured as the bottom-gate structure. The disclosure is applicable to the top-gate display panels as well as the bottom-gate display panels. And the number of the gate is not limited thereto.

FIG. 2 is a cross-sectional view of a FFS (fringe filed switching) mode LCD panel according to another embodiment of the present disclosure. The LCD panel of FIG. 2 is also known as a LCD panel having a top common electrode configuration. Also, the identical elements in FIG. 2 and FIG. 1A are designated with the same reference numerals, and the structural details of the identical elements have been described above and not redundantly repeated herein. Structural difference between FIG. 1B and FIG. 2 is the element connected to the data line DL. In FIG. 2, the first conductive layer 131 (under the second conductive layer 132) is electrically connected to the data line DL. The second conductive layer 132 can be a common electrode, while the first conductive layer 131 can be a pixel electrode, wherein the structure as shown in FIG. 2 is referred to a LCD panel having a top common electrode configuration. Also, the second conductive layer 132 has several slits, while the first conductive layer 131 may have slits or no slit. Accordingly, as shown in FIG. 2, the via 129 penetrates the third insulating layer 127 (disposed between the drain electrode DE of the TFT and the first conductive layer 131) to expose the drain electrode DE. The second conductive layer 132 is disposed in the via 129 for electrically connecting the drain electrode DE, and further electrically connecting the data line DL through the active layer 113.

Generally, each pixel region PX of a FFS mode LCD panel includes at least two domains, such as an upper domain and a lower domain, and the pattern of the electrode is correspondingly designed according to the practical types of the multi-domains in the application, such as the chevron-shaped electrodes as shown in FIG. 1A. In the following description, a pixel region PX having an upper domain and a lower domain is exemplified for illustration (but the applications of the disclosure are not limited thereto), and an electrode corresponding to the pixel region PX has two extending portions 132E and one bending portion 132B, wherein the bending portion 132B is positioned between the two extending portions 132E and connects the two extending portions 132E. In one embodiment exemplifying the pixel region PX of the LCD panel having a top pixel electrode configuration, the second conductive layer 132 is electrically connected to the TFT, as shown in FIG. 1B. In one embodiment exemplifying the pixel region PX of the LCD panel having a top common electrode configuration, the first conductive layer 131 is electrically connected to the TFT, as shown in FIG. 2, wherein the pattern of the common electrode within the pixel region PX defines the extending portions and the bending portion. The extending portions corresponding to the pixel region or the slits are substantially parallel to the extending directions of the data lines DL, and the bending portion is positioned between the two extending portions and connects the two extending portions.

Figure 3B:
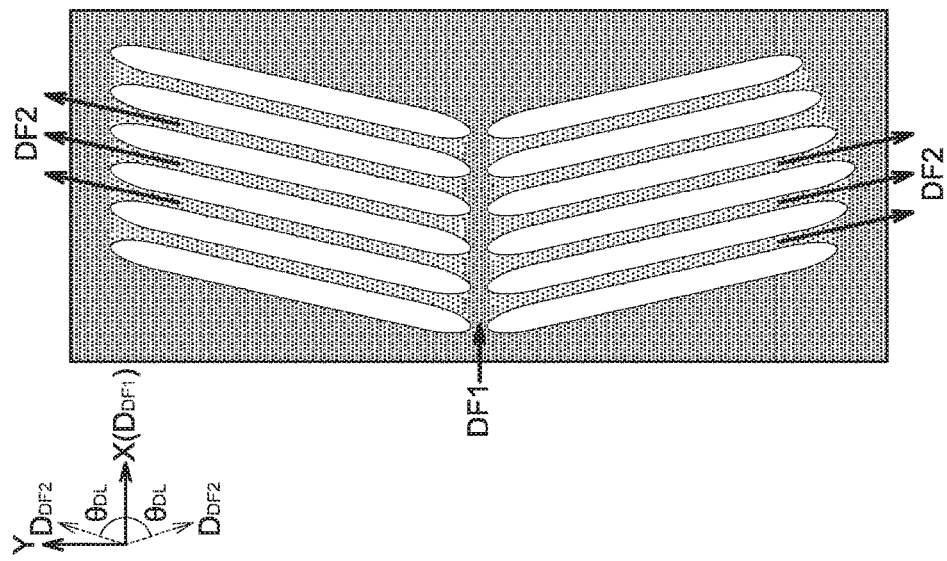
FIG. 3B illustrates a dark pattern as generated if a light passes the pixel region of FIG. 3A.
Figure 3A:
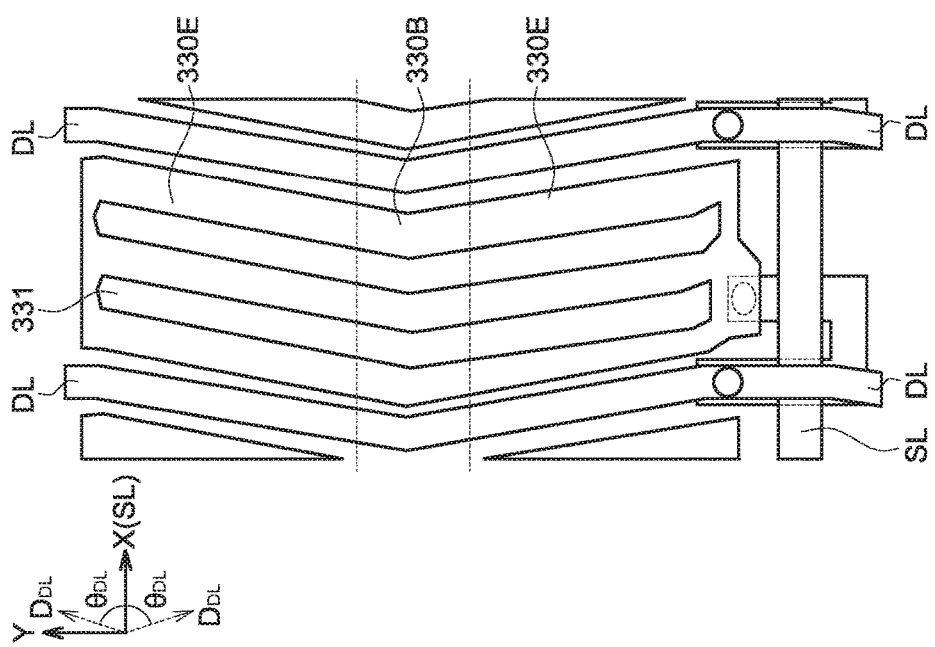
FIG. 3A depict a single pixel region according to an embodiment of the disclosure.

Please refer to FIG. 3A and FIG. 3B. FIG. 3A depict a single pixel region according to an embodiment of the disclosure. The electrode of the pixel region PX has two extending portions 330E and one bending portion 330B, wherein two slits 331 are formed in the electrode of the pixel region PX. The extending portions 330E or the slits 331 are substantially parallel to the extending directions of the data lines DL, and the bending portion 330B is positioned between the two extending portions 330E and connects the two extending portions 330E. In the embodiment, the scan lines SL are patterned as the straight lines and have an extending direction parallel to the X-direction. The data lines DL are not vertical to the scan lines SL, but substantially have an extending direction (Y-direction). In FIG. 3A, an angle $\theta_{DL}$ between the data lines DL and the scan lines (X-direction) is labeled on the XY-plane (Cartesian plane). In other embodiment, the scan lines SL could be patterned as non-straight lines, but still have an extending direction substantially (X-direction). In one embodiment, there is an angle between the two extending portions 330E of the electrode and the scan line SL, and this angle is substantially equal to the angle $\theta_{DL}$ and could be ranged from 80 degrees to 87 degrees, such as 84 degrees. However, the disclosure is not limited to the structural type shown in FIG. 3A and the numerical values provided as the included angle or the angle range. Also, the angles $\theta_{DL}$ between the scan line SL and the two extending portions 330E could be identical or different.

FIG. 3B illustrates a dark pattern as generated if a light passes the single pixel region of FIG. 3A. When a light passes the pixel region, a dark pattern comprising a first dark pattern DF1 and plural second dark patterns DF2 is generated. The first dark pattern DF1 is corresponding to the bending portion 330B of the electrode, and an extending direction of the first dark pattern DF1 (ex: the direction $D_{DF1}$ labeled on the XY-plane of FIG. 3B, which is substantially parallel to the X-direction) is substantially parallel to the scan line. The second dark patterns DF2 are corresponding to the extending portions 330E of the electrode, and the extending directions of the second dark patterns DF2 (ex: the direction $D_{DF2}$ labeled on the XY-plane of FIG. 3B, wherein an angle $\theta_{DF}$ is included between the direction $D_{DF2}$ and the X-axis) are substantially parallel to the extending portions 330E of the electrode.

Figure 4:
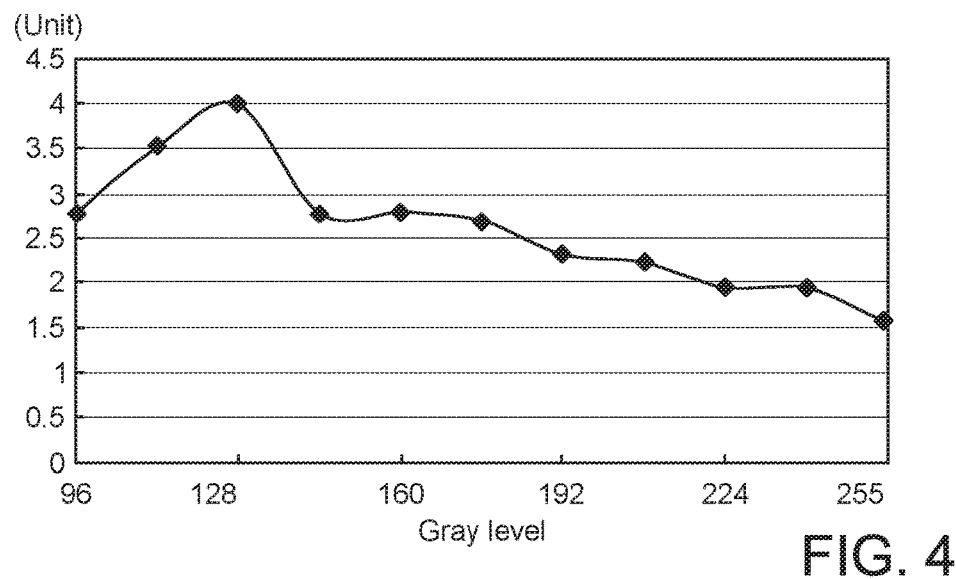
FIG. 4 shows the widths of the first dark pattern varied with the gray levels in a display panel of an embodiment.

Moreover, besides the first dark pattern DF1 (i.e. the dark fringe extended along a direction parallel to the scan lines (X-direction)) and the second dark patterns DF2 are generated when a light passes the pixel region, the width of the first dark pattern DF1 varies with the change in different gray levels. The higher the gray levels, the thinner the width of the first dark pattern DF1. FIG. 4 shows the widths of the first dark pattern varied with the gray levels in a display panel of an embodiment. A display panel capable of exhibiting the gray levels over 0 (black) to 255 (white) (the entire gray levels are 256 gray levels) is exemplified for illustration. Compared the widths respectively in the maximum gray level 255 and the medium gray level 128 of the display panel, the result has indicated that the width (ex: 4 units in FIG. 4) of the first dark pattern DF1 in the medium gray level 128 is 2.6 times as the width (ex: 1.54 units in FIG. 4) of the first dark pattern DF1 in the maximum gray level 255. According to the disclosure, relationships between the width, the viewing angle uniformity parameter and the viewing angle maintenance ratio are investigated and researched. By adjusting the ratio of the widths of the first dark pattern DF1 in the different gray levels, the display panel of the embodiment possesses the better stable maintenance ratio of luminous variation with viewing angle changed in different gray levels (i.e. can be briefly called as the "stable viewing angle maintenance ratio" herein); also, reducing the effect of the variations in manufacturing process.

According to the disclosure, the viewing angle uniformity parameter of the display panel is defined by:

the luminance at θ (angle between the luminous emittance and the Z-axis, the Z-axis is perpendicular to the X-axis and the Y-axis)=60 and φ (angle between the luminous emittance and the horizontal axis, i.e. X-axis)=90 divided by the luminance at θ=60 and φ=0. Typically, luminance means luminous power corresponding to the angle θ and angle φ per unit area. Thus, the viewing angle uniformity parameter of the display panel can be represented by the mathematical formula (1) as below:

$$\text{Lum}(\theta 60, \varphi 90)/\text{Lum}(\theta 60, \varphi 0) \qquad (1).$$

The viewing angle maintenance ratio of the display panel can be defined as:

the viewing angle uniformity parameter in the medium gray level/the viewing angle uniformity parameter in the maximum gray level, wherein the medium gray level and the maximum gray level are determined according to the gray scale of the display panel in the application. Typically, the medium gray level is equal to half of the total number of the gray levels. For example, if a display panel is capable of exhibiting the gray levels from 0 (black) to 63 (white), the maximum gray level is 63, the total number of the gray levels is 64; thus, the medium gray level is 32. If a display panel is capable of exhibiting the gray levels from 0 (black) to 255 (white), the maximum gray level is 255 and the total number of the gray levels is 256; thus, the medium gray level is 128. If a display panel is capable of exhibiting the gray levels from 0 (black) to 1023 (white), the maximum gray level is 1023 and the total number of the gray levels is 1024; thus, the medium gray level is 512.

Thus, the viewing angle maintenance ratio of an embodied display panel having gray levels from 0 (black) to 255 (white) can be represented by the mathematical formula (2) as below:

the viewing angle uniformity parameter in 128 gray level/the viewing angle uniformity parameter in 255 gray level (2).

Figure 5:
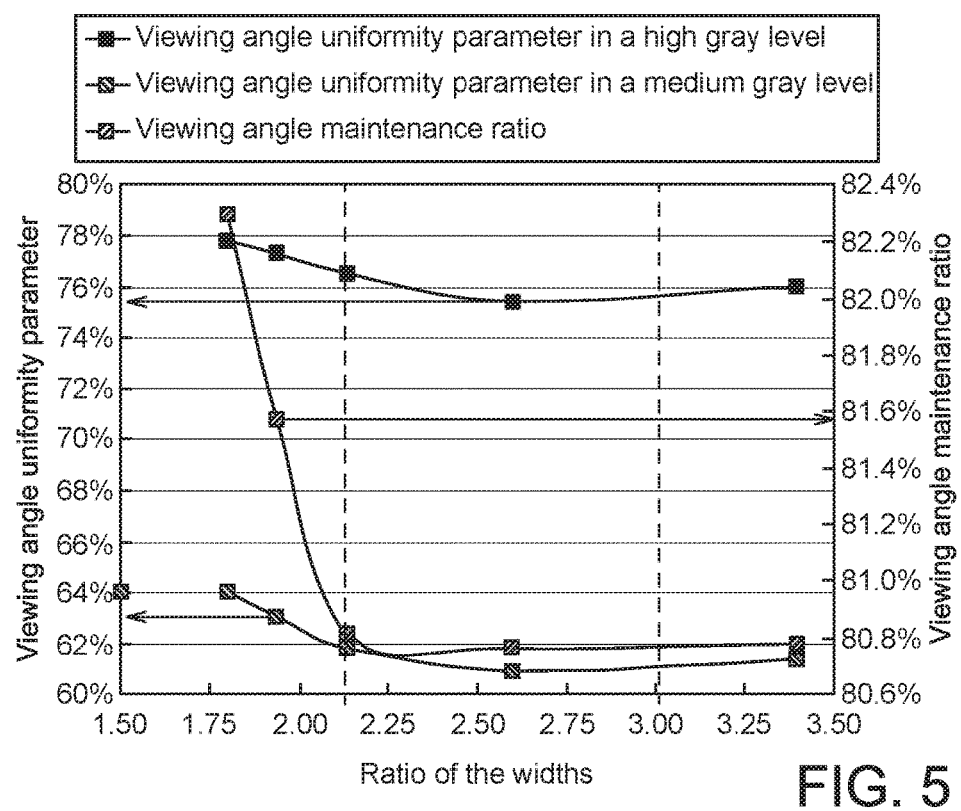
FIG. 5 shows the viewing angle uniformity parameter in the medium gray level, the viewing angle uniformity parameter in the maximum gray level and the viewing angle maintenance ratio each varied with the ratio of the widths according to an embodiment of the disclosure.

FIG. 5 shows the viewing angle uniformity parameter in the medium gray level, the viewing angle uniformity parameter in the maximum gray level and the viewing angle maintenance ratio each varied with the ratio of the widths of the first dark pattern DF1 according to an embodiment of the disclosure. The ratio of the widths of the first dark pattern DF1 is defined by dividing the width of the first dark pattern DF1 in the medium gray level (ex: 128) by the width of the first dark pattern DF1 in the maximum gray level (ex: 255). Also, the left Y-axis of FIG. 5 represents the viewing angle uniformity parameters in the medium gray level and the viewing angle uniformity parameters in the maximum gray level. The right Y-axis of FIG. 5 represents the viewing angle maintenance ratio (i.e. dividing the viewing angle uniformity parameter in the medium gray level by the viewing angle uniformity parameter in the maximum gray level). As shown in FIG. 5, the results indicate that the viewing angle maintenance ratio suffers from dramatically change when the ratio of the widths of the first dark pattern DF1 is smaller than 2.1. When the ratio of the widths of the first dark pattern DF1 is larger than 2.1, such as in a range from about 2.1 to about 3.0, the viewing angle maintenance ratio exhibits a stable result, and it would not be easily affected by the variations in manufacturing process. It is known that the higher the ratio of the widths of the first dark pattern DF1, the lower the aperture ratio of the pixel. Accordingly, an upper limit should be set according to the aperture ratio of the pixel in the practical application. For example, when the ratio of the widths of the first dark pattern DF1 is larger than 3.0 and it has been found that the width is too wide and the aperture ratio of the pixel is unacceptable, the value of "3.0" could be selected as an upper limit of the ratio of the widths of the first dark pattern DF1.

Figure 6:
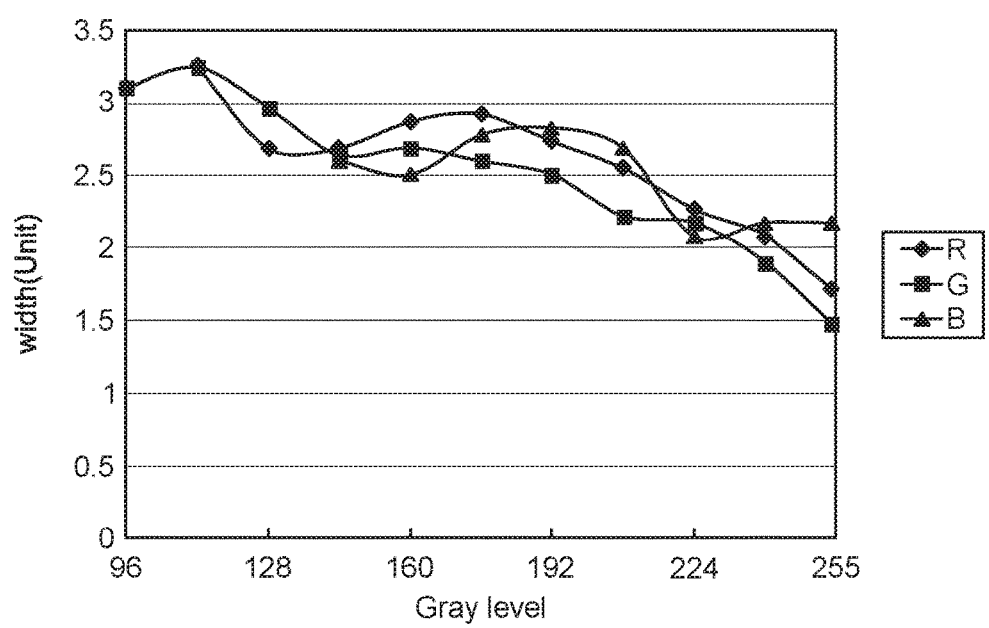
FIG. 6 shows the widths varied with the gray levels in different colored R, G and B sub-pixels of the display panel according to an embodiment of the disclosure.

Additionally, human eyes are most sensitive to the green color. It is assumed that the display panel is equipped with a color filter layer and RGB sub-pixels are used. Since human eyes are most sensitive to the green color and the green sub-pixels have largest influence on the pixel transmittance, it is desirable that the transmittance of green sub-pixels can be increased in practical design. The width of the first dark pattern DF1 affects the transmittance. The narrower the width of the first dark pattern DF1, the higher the front-view transmittance. FIG. 6 shows the widths of the first dark pattern DF1 varied with the gray levels in different colored R, G and B sub-pixels of the display panel according to an embodiment of the disclosure. According to the design concept of the embodiment, a maximum luminance of the green sub-pixels can be obtained by decreasing the width of the first dark pattern DF1 in the maximum gray level, thereby increasing the transmittance of the green sub-pixels. In one embodiment, when a light passes the pixel region, a dark pattern comprising such as the first dark pattern DF1 shown in FIG. 3A and FIG. 3B is generated. When the pixel region PX is a green sub-pixel region, the first dark pattern (ex: DF1) has a first green width in the maximum gray level. When the pixel region PX is a red sub-pixel region, the first dark pattern (ex: DF1) has a first red width in the maximum gray level. When the pixel region PX is a blue sub-pixel region, the first dark pattern (ex: DF1) has a first blue width in the maximum gray level. It is designed that the first green width is smaller than the first red width, and the first green width is also smaller than the first blue width.

Three different ways to achieve the embodied ratio (such as 2.1 to 3.0) of the first width (of the first dark pattern in a first gray level; ex: a medium gray level) to a second width (of the first dark pattern in a second gray level; ex: a maximum gray level) are described below for illustrations. However, the disclosure is not limited to those details, and other technical ways capable of accomplishing the ratio of the first width to the second width of the embodiment are also applicable.

<Ratio of Widths of the First Dark Pattern Controlled by Adjusting Exposure Method to the Photo Alignment Layer>

The embodiment of the disclosure can be applied to a display panel with a photo alignment (PA) layer. For example, the photo alignment layers such as the polyimide (PI) alignment layers are respectively disposed above the first conductive layer 131 and the second conductive layer 132, followed by irradiating with the UV light to create the alignment direction for the liquid crystal (LC) molecules. In the embodiment, one of applicable technical ways to control the ratio of a width of the first dark pattern in the medium gray level to a width of the first dark pattern in the maximum gray level is adjustment of exposure method to the photo alignment layers, thereby achieving an appropriate ratio of the widths (i.e. the width of the first dark pattern in the medium gray level (ex: 128) to a width of the first dark pattern in the maximum gray level (ex: 255)), such as equal to or larger than 2.1 (ex: ranged from about 2.1 to about 3.0). Accordingly, the viewing angle maintenance ratio is relatively stable, and reducing the effect of the variations in manufacturing process.

Figures 7, 8:
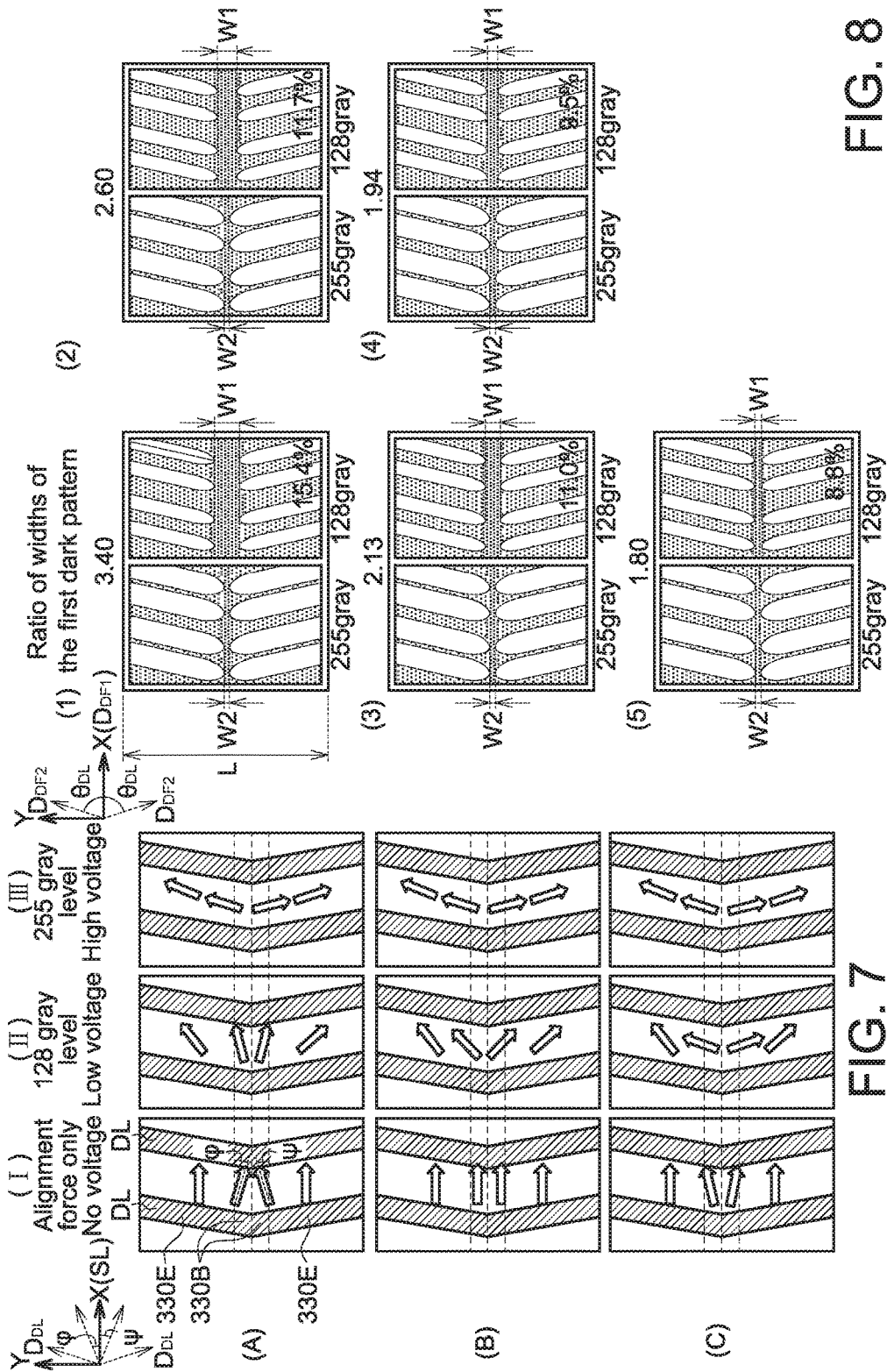
FIG. 7 illustrates several patterns of the LC molecules aligning in the pixel regions resulting from different alignment directions, thereby obtaining the higher ratio, the medium ratio and the lower ratio of the widths in the pixel regions.
FIG. 8 illustrates several dark patterns having different ratios of widths of the first dark pattern in the corresponding pixel region.

FIG. 7 illustrates several patterns of the LC molecules aligning in the pixel regions resulting from different alignment directions, thereby obtaining the higher ratio, the medium ratio and the lower ratio of the widths of the first dark pattern in the pixel regions. In FIG. 7, the patterns (A) represent three different alignments of the LC molecules in the pixel regions to which no voltage (I), a low voltage (II) and a high voltage (III) are respectively applied, and a higher ratio of the widths of the first dark pattern in the pixel regions can be obtained. The patterns (B) represent three different alignments of the LC molecules in the pixel regions to which no voltage (I), a low voltage (II) and a high voltage (III) are respectively applied, and a medium ratio of the widths of the first dark pattern in the pixel regions can be obtained. The patterns (C) represent three different alignments of the LC molecules in the pixel regions to which no voltage (I), a low voltage (II) and a high voltage (III) are respectively applied, and a lower ratio of the widths of the first dark pattern in the pixel regions can be obtained. In other words, the patterns in the first column (I) of FIG. 7 represent the alignments of the LC molecules in the pixel regions to which no voltage is applied; the patterns in the second column (II) of FIG. 7 represent the alignments of the LC molecules in the pixel regions to which a low voltage is applied, and the pixel regions exhibit the medium gray level (ex: 128). Also, patterns in the third column (III) of FIG. 7 represent the alignments of the LC molecules in the pixel regions to which a high voltage is applied, and the pixel regions exhibit the maximum gray level (ex: 255).

In FIG. 7, it simply depicts the electrode pattern in a single pixel region, and omits other elements. In a single pixel region, an electrode comprises two extending portions 330E and one bending portion 330B, wherein the bending portion 330B is positioned between the two extending portions 330E and connects the two extending portions 330E. The extending directions of the extending portions 330E, labeled as the directions $D_{DL}$ on the XY-plane, are substantially parallel to the extending directions of the data lines DL. Also, the arrows in the pixel region represent the alignments of the LC molecules at the corresponding regions.

According to the adjustment of alignment direction as illustrated in FIG. 7, different dark patterns corresponding to the alignments of the LC molecules can be generated, as shown in FIG. 8. Please refer to FIG. 7 and FIG. 8. FIG. 8 illustrates several dark patterns having different ratios of widths in the corresponding pixel region, and the first width W1 in a medium gray level such as 128 (i.e. the first gray level) and the second width W2 in a maximum gray level such as 255 (i.e. the second gray level) of the first dark pattern are also labeled in each of the patterns. The extending direction of the first dark pattern, labeled as the directions $D_{DF1}$ (parallel to X-direction) on the XY-plane, is substantially parallel to the extending direction of the scan line SL. In FIG. 8, the pattern (1) has a ratio of the widths (i.e. the first width divided by the second width, W1/W2) of 3.4, the pattern (2) has a ratio of the widths of 2.6, the pattern (3) has a ratio of the widths of 2.13, the pattern (4) has a ratio of the widths of 1.9, and the pattern (5) has a ratio of the widths of 1.8.

Please refer to the patterns (A) including (I), (II) and (III) of FIG. 7 (ex: adopting negative type liquid crystals in the display panels) and the pattern (1) or pattern (2) of FIG. 8. If it is desired to obtain a higher ratio of the widths (W1/W2), such as 3.4 or 2.6, or other high values, it can be designed that the LC molecules in the region corresponding to the bending portion 330B of the electrode are pre-rotated (ex: on the XY-plane) in response to the alignment direction of the photo alignment layers after UV exposure, so that an angle $\varphi$ (i.e. azimuthal angle of pre-$\varphi$) as shown in the pattern (A)-(I) of FIG. 7 is created between the LC molecules and the scan line SL. Therefore, when no voltage is applied to the pixel electrode, the LC molecules in the region corresponding to the bending portion 330B exhibit an alignment of adduction (ex: aligned toward the center of the bending portion 330B), and the LC molecules in the region corresponding to the extending portions 330E are aligned in parallel to the scan line SL, as shown in the pattern (A)-(I) of FIG. 7. When the voltage applied to the pixel electrode is increased, such as a low voltage applied for reaching the value related to the medium gray level (ex: 128), the LC molecules in the region corresponding to the bending portion 330B of the electrode rotate outwardly, as shown in the pattern (A)-(II) (applying low voltage) of FIG. 7. When the voltage applied to the pixel electrode reaches the value related to the maximum gray level (ex: 255) (pattern (A)-(III) of FIG. 7), the LC molecules in the regions corresponding to the bending portion 330B and the extending portions 330E of the electrode can be aligned along the equipotential lines of the electric field. Thus, the widths in the medium gray level and in the maximum gray level (W1 and W2) can be obtained by adjusting the exposure method to the photo alignment layer, thereby controlling the ratio (W1/W2) of the widths thereof.

Similarly, if it is desired to obtain a medium ratio of the widths (W1/W2), such as 2.13 or 1.9, or other medium values, it is designed that the LC molecules in the regions corresponding to the bending portion 330B and the extending portions 330E of the electrode can be aligned in response to the alignment direction of the photo alignment layers after UV exposure, so as to exhibit an alignment as shown in the pattern (B)-(I) of FIG. 7. When a low voltage and a high voltage are applied to the pixel electrode, the LC molecules exhibit an alignment as shown in the patterns (B)-(II) and (B)-(III) of FIG. 7, respectively. If the LC molecules in the region corresponding to the bending portion 330B are able to aligned outwardly as shown in the pattern (C)-(I) of FIG. 7, which are aligned in response to the alignment direction of the photo alignment layers after UV exposure, it is likely to obtain a lower ratio of the widths (W1/W2), such as 1.8, or other values lower than 1.8.

In one embodiment, after creating the alignment directions of the photo alignment layers after UV exposure, as depicted in FIG. 7, the LC molecules in the region corresponding to the bending portion 330B of the electrode are pre-rotated to exhibit an angle φ (pre-φ) to the scan line SL, a ratio of the widths (W1/W2) can be obtained subsequently. For example, if the angle φ is 5 degrees toward the center of the bending portion 330B and the dark pattern is shown as FIG. 8-(1), a ratio of the widths (W1/W2) is 3.4. If the angle φ is 0.5 degrees toward the center of the bending portion 330B and the dark pattern is shown as FIG. 8-(2), a ratio of the widths (W1/W2) is 2.6. If the angle φ is 20 degrees outwardly and the dark pattern is shown as FIG. 8-(3), a ratio of the widths (W1/W2) is 2.13. If the angle φ is 40 degrees outwardly and the dark pattern is shown as FIG. 8-(4), a ratio of the widths (W1/W2) is 1.9. If the angle φ is 60 degrees outwardly and the dark pattern is shown as FIG. 8-(5), a ratio of the widths (W1/W2) is 1.8.

Additionally, the dark pattern occupied percentages of each of the dark patterns have been labeled in FIG. 8, wherein the dark pattern occupied percentage is determined by checking the dark fringes in the medium gray level such as 128 (i.e. the first gray level) occupied in the pixel region. A dark pattern occupied percentage is defined by: the width (W1) along the Y-direction of the first dark pattern/a total length L of the pixel region (i.e. W1/L). In FIG. 8-(1), the dark pattern occupied percentage in the medium gray level such as 128 is about 15.4%. In FIG. 8-(2), the dark pattern occupied percentage in the medium gray level such as 128 is about 11.7%. In FIG. 8-(3), the dark pattern occupied percentage in the medium gray level such as 128 is about 11.0%. In FIG. 8-(4), the dark pattern occupied percentage in the medium gray level such as 128 is about 9.5%. In FIG. 8-(5), the dark pattern occupied percentage in the medium gray level such as 128 is about 8.8%. The higher the dark pattern occupied percentage, the lower the aperture ratio of the pixel. An upper limit of the ratio of the widths (W1/W2) should be determined according to the requirement of the pixel aperture ratio in the practical application. For example, if the ratio of widths (W1/W2) is larger than 3.0 and it has been found that the dark pattern occupied percentage in the medium gray level is too high to accept (such as the dark pattern occupied percentage is over 15% when the ratio of widths (W1/W2) is 3.4), the width of the first dark pattern would be too wide to accept since the aperture ratio of the pixel would be too low. Thus, a ratio of widths (W1/W2) in a suitable range has to be determined to meet the requirements of practical application. In one embodiment, the ratio of widths (W1/W2) (i.e. the width in the medium gray level (ex: 128) divided by the width in the maximum gray level (ex: 255)) in a suitable range such as ranged from about 2.1 to about 3.0 can be selected, not only for obtaining the more stable viewing angle maintenance (or would reduce the effect of the variations in manufacturing process) but also for meeting the aperture ratio requirements of practical products.

<Ratio of Widths of the First Dark Pattern Controlled by Modifying the Shape of Pixel Electrode>

According to the embodiment, one of applicable technical ways is changing the shape of the pixel electrode for controlling the widths of the first dark pattern respectively in the medium and maximum gray levels, thereby obtaining a suitable ratio of the widths (i.e. the width of the first dark pattern in the medium gray level (ex: 128) divided by the width of the first dark pattern in the maximum gray level (ex: 255)), such as equal to or larger than 2.1 (ex: about 2.1-about 3.0) for achieving the stable viewing angle maintenance and the effect of the variations in manufacturing process can be reduced. In another embodiment, the slit pattern on the common electrode within the pixel region can be changed, similar to the pixel electrode pattern having the extending portions and the bending portion, in order to control the ratio of the width of the first dark pattern in the medium gray level to the width of the first dark pattern in the maximum gray level.

Figure 9:
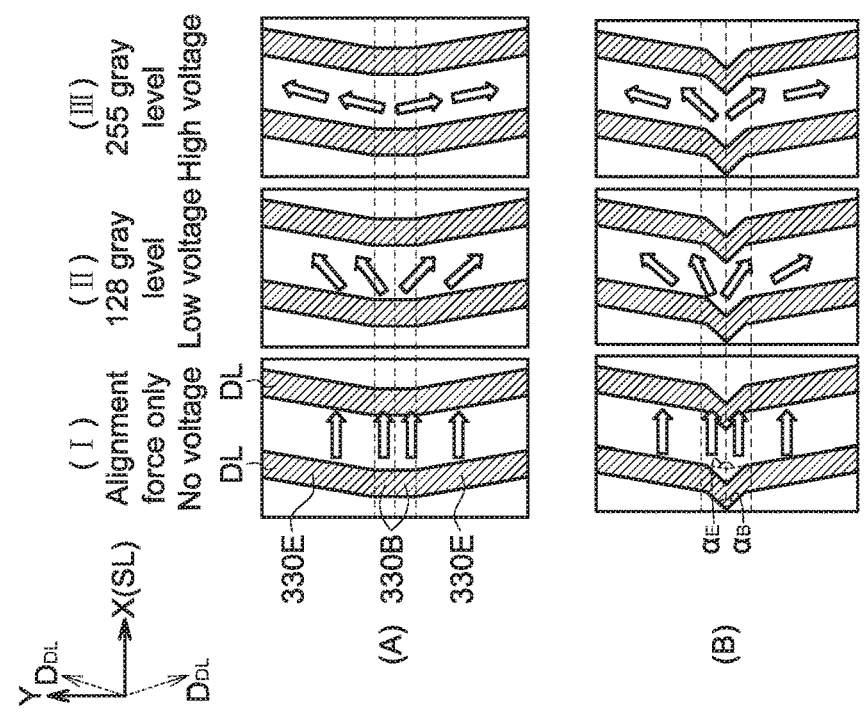
FIG. 9 illustrates several patterns of the LC molecules aligning in the pixel regions in response to the shapes of the pixel electrode.

FIG. 9 illustrates several patterns of the LC molecules aligning in the pixel regions in response to the shapes of the pixel electrode, thereby obtaining the higher ratio and the lower ratio of the widths of the first dark pattern in the pixel regions. In FIG. 9, the patterns (A) represent three different alignments of the LC molecules in the pixel regions to which no voltage (I), a low voltage (II) and a high voltage (III) are respectively applied, and a higher ratio (such as 2.86, or other higher values) of the widths of the first dark pattern in the pixel regions can be obtained. The patterns (B) represent three different alignments of the LC molecules in the pixel regions to which no voltage (I), a low voltage (II) and a high voltage (III) are respectively applied, and a lower ratio (such as 2.26, or other lower values) of the widths of the first dark pattern in the pixel regions can be obtained. Similarly, the arrows in the pixel region represent the alignments of the LC molecules at the corresponding regions. In the patterns (A) of FIG. 9 (i.e. having a higher ratio of the widths of the first dark pattern), an electrode comprises two extending portions 330E and one bending portion 330B, wherein the extending portions 330E are substantially parallel to the extending directions of the data lines DL, but the shape of the bending portion 330B is modified to have both sides perpendicular to the extending direction of the scan line SL (i.e. the sides of the bending portion 330B being parallel to the Y-direction). Please refer to the patterns (A) including (I), (II) and (III) of FIG. 9 and the pattern (1) of FIG. 10. If it is desired to obtain a higher ratio of the widths of the first dark pattern (W1/W2) (such as 2.86, or other higher values), the shape of the bending portion 330B can be changed as depicted in FIG. 9-(A). When no voltage is applied to the pixel electrode, the LC molecules are aligned in response to the alignment force, wherein the LC molecules exhibit an alignment parallel to the scan line SL in the regions corresponding to the bending portion 330B and the extending portions 330E, as shown in the pattern (A)-(I) of FIG. 9. When the voltage applied to the pixel electrode is increased, such as a low voltage applied for reaching the value related to the medium gray level (ex: 128), the LC molecules in the region corresponding to the bending portion 330B of the electrode rotate outwardly, as shown in the pattern (A)-(II) (applying low voltage) of FIG. 9. When the voltage applied to the pixel electrode reaches the value related to the maximum gray level (ex: 255) (pattern (A)-(III) of FIG. 9), the LC molecules in the regions corresponding to the bending portion 330B and the extending portions 330E of the electrode can be aligned along the equipotential lines of the electric field. Thus, the widths of the first dark pattern in the medium gray level and in the maximum gray level (W1 and W2) can be obtained by adopting special shape of the pixel electrode, thereby controlling the ratio (W1/W2) of the widths thereof.

Additionally, if it is desired to obtain a lower ratio of the widths (W1/W2), the shape of the pixel electrode can also be changed by projecting the sides of the bending portion 330B from one side of the extending portions 330E, but remaining the design of the extending portions 330E (i.e. the extending portions 330E are substantially parallel to the extending directions of the data lines DL), as shown in the patterns (B) of FIG. 9. In the pattern (B) of FIG. 9, it is indicated that an angle αB of the bending portion 330B is smaller than an angle αE of the extending portions 330E. Please refer to the patterns (B) including (I), (II) and (III) of FIG. 9 and the pattern (2) of FIG. 10. If it is desired to obtain a lower ratio of the widths (W1/W2), such as 2.26, or other lower values, the shape of the bending portion 330B can be changed as depicted in FIG. 9-(B). When no voltage is applied to the pixel electrode, the LC molecules are aligned in response to the alignment force, wherein the LC molecules exhibit an alignment parallel to the scan line SL in the regions corresponding to the bending portion 330B and the extending portions 330E, as shown in the pattern (B)-(I) of FIG. 9. When the voltage applied to the pixel electrode is increased, such as a low voltage applied for reaching the value related to the medium gray level (ex: 128), the LC molecules in the region corresponding to the bending portion 330B of the electrode rotate outwardly, as shown in the pattern (B)-(II) (applying low voltage) of FIG. 9. When the voltage applied to the pixel electrode reaches the value related to the maximum gray level (ex: 255) (pattern (B)-(III) of FIG. 9), the LC molecules in the regions corresponding to the extending portions 330E of the electrode can be aligned along the equipotential lines of the electric field. In the pattern (B)-(III) of FIG. 9, although the LC molecules in the regions corresponding to the bending portion 330B rotate more outwardly than that exhibited in the pattern (B)-(II) of FIG. 9, they are not aligned as the way the LC molecules in the regions corresponding to the extending portions 330E do (thus, the width W2 in the maximum gray level of FIG. 10-(2) would be slightly larger than that of FIG. 10-(1)). Accordingly, the widths in the medium gray level and in the maximum gray level (W1 and W2) can be obtained by adopting special shape of the pixel electrode, thereby controlling the ratio of the widths (W1/W2) and achieving the stable viewing angle maintenance (or would reduce the effect of the variations in manufacturing process) consequently.

Figure 10:
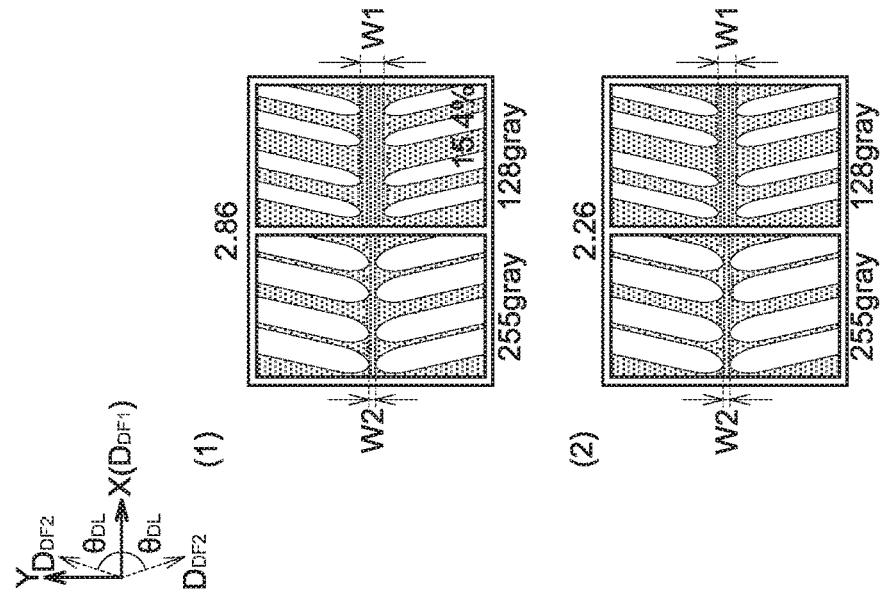
FIG. 10 illustrates two dark patterns having different ratios of widths of the first dark pattern in the corresponding pixel region according to different shapes of the pixel electrode.

According to the modification of the pixel electrode as illustrated in FIG. 9, different dark patterns corresponding to the alignments of the LC molecules can be generated, as shown in FIG. 10. Please refer to FIG. 9 and FIG. 10. FIG. 10 illustrates two dark patterns having different ratios of widths in the corresponding pixel region, and the first width W1 in a medium gray level such as 128 (i.e. the first gray level) and the second width W2 in a maximum gray level such as 255 (i.e. the second gray level) of the first dark pattern are also labeled in each of the patterns. The extending direction of the first dark pattern, labeled as the directions $D_{DF1}$ (parallel to X-direction) on the XY-plane, is substantially parallel to the extending direction of the scan line SL. In FIG. 10, the pattern (1) has a ratio of the widths (W1/W2) of 2.86, and the pattern (2) has a ratio of the widths (W1/W2) of 2.26.

<Ratio of Widths of the First Dart Pattern Controlled by Elastic Constants of Liquid Crystal>

Figure 11A:
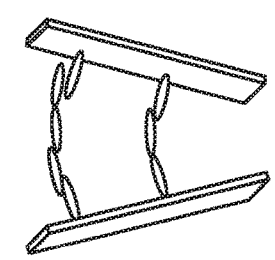
FIG. 11A, FIG. 11B and FIG. 11C illustrate the splay, twist and band types of deformation in liquid crystal molecules, respectively.
Figure 11B:
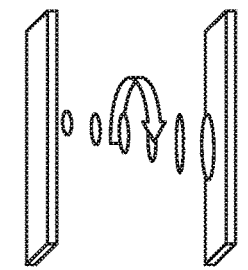
Figure 11C:
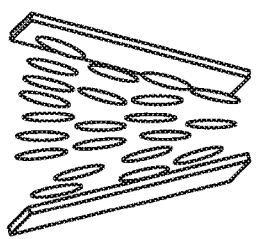

Liquid crystal molecules can be regarded as an elastic medium, which can be deformed by even small external forces, such as forces in an electric field, a magnetic field and etc. The deformations in liquid crystal molecules can be described in terms of three basic types of deformation: splay, twist and band, wherein the elastic constants corresponding to these deformations are K11, K22, and K33, respectively. Please refer to FIG. 11A, FIG. 11B and FIG. 11C, which respectively illustrate the splay, twist and band types of deformation in liquid crystal molecules. In the embodiment, one of applicable technical ways is adoption of the liquid crystal molecules with different elastic constants for controlling the widths of the first dart pattern respectively in the medium and maximum gray levels, thereby obtaining a suitable ratio of the widths of the first dart pattern, such as equal to or larger than 2.1 (ex: about 2.1- about 3.0) as discussed above. Therefore, the stable viewing angle maintenance can be achieved, and it would not be easily affected by the variations in manufacturing process.

Figure 12:
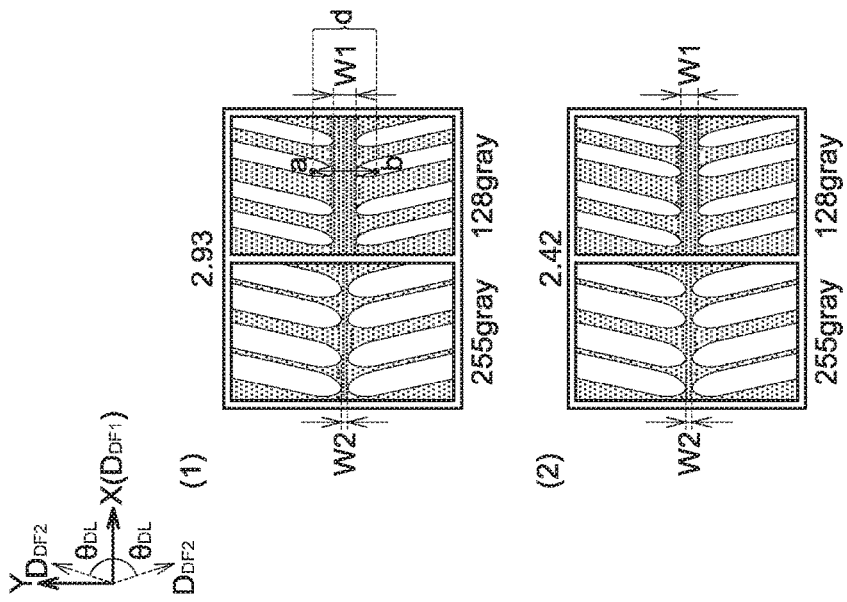
FIG. 12 illustrates two dark patterns having different ratios of widths of the first dark pattern in the corresponding pixel region according to different deformations in liquid crystal molecules.

FIG. 12 illustrates two dark patterns having different ratios of widths of the first dart pattern in the corresponding pixel region, and the first width W1 of the first dart pattern in a medium gray level such as 128 (i.e. the first gray level) and the second width W2 of the first dart pattern in a maximum gray level such as 255 (i.e. the second gray level) are also labeled in each of the patterns. The extending direction of the first dark pattern, labeled as the directions $D_{DF1}$ (parallel to X-direction) on the XY-plane, is substantially parallel to the extending direction of the scan line SL. In FIG. 12, the pattern (1) has a larger ratio of the widths (i.e. the first width divided by the second width, W1/W2) of 2.93 by adopting the liquid crystal molecules having lower splay elastic constant K11. In FIG. 12, the pattern (2) has a lower ratio of the widths (W1/W2) of 2.42 by adopting the liquid crystal molecules having higher splay elastic constant K11.

In one embodiment, the liquid crystal molecules (or liquid crystal material) of the liquid crystal layer has a splay elastic constant (K11) in a range of 10 to 20. In one embodiment, the liquid crystal molecules (or liquid crystal material) of the liquid crystal layer has a bend elastic constant (K33) in a range of 10 to 25. According to the embodiments, a suitable ratio of the widths (W1/W2) can be obtained, such as in a range of about 2.1 to about 3.0. Therefore, the stable viewing angle maintenance can be achieved, and it would not be easily affected by the variations in manufacturing process.

According to the aforementioned description, a width in the medium gray level and a width in the maximum gray level can be obtained by adjusting the exposure method to the photo alignment layers (i.e. adjusting the angle φ between the LC molecules corresponding to the bending portion 330B and the scan line SL), or by changing the shape of the electrode, or by adopting the LC molecules having a suitable elastic constant (such as the splay elastic constant K11 or the bend elastic constant K33), thereby controlling the ratio of the widths (W1/W2) thereof to be within a range (such as a range from about 2.1 to about 3.0). In this range of the ratio (i.e. W1/W2), the stable viewing angle maintenance can be achieved, and it would not be easily affected by the variations in manufacturing process. It is noted that other applicable technical ways can be adopted in the embodiment, as long as capable of controlling the width of the first dark pattern in the medium gray level and a width of the first dark pattern in the maximum gray level, thereby achieving an appropriate ratio thereof (i.e. W1/W2).

Figure 13:
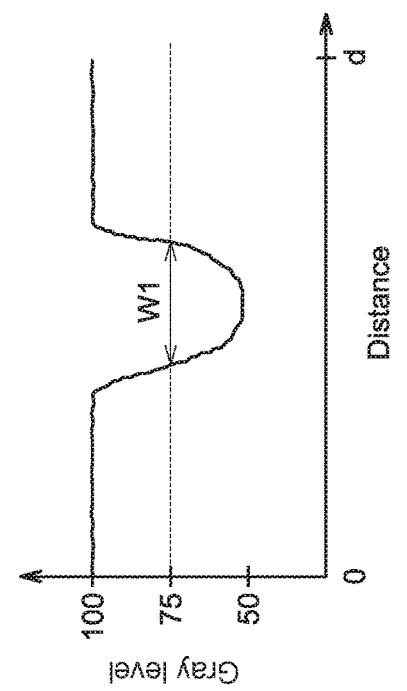
FIG. 13 shows a gray scale curve corresponding to the distance d in FIG. 12-(1).

Moreover, a width of the first dark pattern of the embodiment can be determined according to the following procedures. Please refer to FIG. 12-(1). Measurement of the first dark pattern in the medium gray level such as 128 (the first gray level) is conducted. A portion of the first dark pattern which spans over the distance d between the point "a" and point "b" is captured by an image capture software and saved as a gray scale image. Please refer to FIG. 13, which shows a gray scale curve corresponding to the distance d in FIG. 12-(1). It is assumed that the largest gray level corresponding to the distance d is 100 and the smallest corresponding to the distance d is 50. Then, a width of the first dark pattern can be determined as the width corresponding to the FWHM (full width at half maximum) value, i.e. 75. Accordingly, the first width W1 of the first dark pattern as shown in FIG. 12-(1) can be determined. This approach is suitable for determining all of the widths of the embodiment. Additionally, in one embodiment, measurement of the first dark pattern can be conducted using an ocular of 10× Olympus and an objective of 50× Olympus. Also, the light source is provided by the back light module, and a Charge Coupled Device (CCD, Model: Motic Moticam 2300) can be adopted.

According to the display panel of the embodiment, the width of the first dark pattern in the medium gray level and the width of the first dark pattern in the maximum gray level can be modified in a suitable range, such as in a range from about 2.1 to about 3.0. In this range of the ratio (i.e. W1/W2), the better stable viewing angle maintenance can be achieved, and the effect of the variations in manufacturing process can be reduced. Moreover, the display panel of the embodiment still possesses high aperture ratio to meet the requirement of the products in the application. Accordingly, the production yield of the display panel manufactured by the design of the embodiment is increased, and the reliable and stable displaying quality of the embodied display panel is obtained consequently.

It is noted that the structures as described above are provided for illustration. The disclosure is not limited to the configurations and any details disclosed above, and the exemplified structures and alignments could be adjusted and changed based on the actual needs of the practical applications. For example, the patterns of the first and second conductive layers (including the slit number, the slit width, the electrode branch width, . . . etc.), or the angle between the data line and scan line, or the slits having the curving end portions . . . etc. are applicable in the embodiment of the disclosure. Also, a LCD panel having a top pixel electrode configuration or a LCD panel having a top common electrode configuration can be applied by the disclosure. Moreover, the liquid crystal alignment can be achieved by photo alignment or rubbing alignment; and the disclosure has no particular limitation thereto. In one embodiment, the liquid crystal molecules of the liquid crystal layer may have pre-tilted angles ranged from 0 degree to 4 degrees (for example, the pre-tilted angle could be 0 degree in the application using photo alignment, and the pre-tilted angle could be 2 degree in the application using rubbing alignment). Also, the positive type liquid crystals or the negative type liquid crystals can be adopted in the display panels of the embodiment. It is known the exemplified structures and details could be adjusted and changed based on the actual needs of the practical applications.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A display panel, comprising:
　a first substrate, comprising:
　　scan lines, disposed above a first base; and
　　data lines, disposed above the first base and intersecting with the scan lines to define pixel regions, and at least one of the pixel regions comprising:
　　　an electrode, having two extending portions and one bending portion, wherein the two extending portions are substantially parallel to an extending direction of the data lines, and the bending portion is positioned between the two extending portions and connects the two extending portions;
　a second substrate, opposite to the first substrate; and
　a liquid crystal layer, disposed between the first substrate and the second substrate,
　when a light passing said one of the pixel regions, a dark pattern comprising a first dark pattern and plural second dark patterns being generated in said one of the pixel regions, wherein the first dark pattern is corresponding to the bending portion of the electrode, and an extending direction of the first dark pattern is substantially parallel to an extending direction of the scan line; and the second dark patterns are corresponding to the two extending portions of the electrode,
　wherein the first dark pattern has a first width in a first gray level and a second width in a second gray level, and a ratio of the first width to the second width is in a range of 2.1 to 3.0, wherein the second gray level is a maximum gray level of the display panel, and the first gray level is equal to half of all gray levels.

2. The display panel according to claim 1, wherein the first dark pattern has a first green width in the second gray level while said one of the pixel regions is a green sub-pixel region, the first dark pattern has a first red width in the second gray level while said one of the pixel regions is a red sub-pixel region, and the first green width is smaller than the first red width.

3. The display panel according to claim 2, wherein the first dark pattern has a first blue width in the second gray level while said one of the pixel regions is a blue sub-pixel region, and the first green width is smaller than the first blue width.

4. The display panel according to claim 1, wherein the second dark patterns have extending directions substantially parallel to the two extending portions of the electrode.

5. The display panel according to claim 1, wherein the second gray level is said maximum gray level of the display panel, and the first gray level is a medium gray level of the display panel.

6. The display panel according to claim 1, wherein a liquid crystal material of the liquid crystal layer has a splay elastic constant (K11) in a range of 10 to 20.

7. The display panel according to claim 1, wherein a liquid crystal material of the liquid crystal layer has a bend elastic constant (K33) in a range of 10 to 25.

8. The display panel according to claim 1, wherein liquid crystal molecules of the liquid crystal layer have pre-tilted angles ranged from 0 degree to 4 degrees.

9. The display panel according to claim 1, wherein an angle between the two extending portions of the electrode and the scan line is in a range of 80 degrees to 87 degrees.

10. The display panel according to claim 1, wherein the electrode comprises a plurality of electrode branches and a plurality of slits, and each of the plurality of slits positioned between the plurality of electrode branches, wherein each of the plurality of electrode branches comprises the bending portion and the two extending portions, and the bending portion is positioned between the two extending portions and connects the two extending portions.

11. The display panel according to claim 10, wherein each of the slits has a width in a range of 1.5 µm to 4 µm.

12. The display panel according to claim 10, wherein each of the plurality of electrode branches has a width in a range of 1.5 µm to 4 µm.

13. The display panel according to claim 1, wherein the at least one of the pixel regions further comprises a thin film transistor (TFT), a first conductive layer above the thin film transistor, an insulating layer disposed between the thin film transistor and the first conductive layer, and a second conductive layer above the first conductive layer, wherein the electrode is one of the first conductive layer and the second conductive layer, and electrically connected to the thin film transistor.

14. The display panel according to claim 13, wherein the first conductive layer and the second conductive layer are spaced apart a distance ranged from 50 nm to 700 nm.

15. The display panel according to claim 13, wherein the insulating layer between the thin film transistor and the first conductive layer is an organic insulating layer, and the first conductive layer and the second conductive layer are spaced apart a distance ranged from 300 nm to 700 nm.

16. The display panel according to claim 13, wherein the insulating layer between the thin film transistor and the first conductive layer is an inorganic insulating layer, and the first conductive layer and the second conductive layer are spaced apart a distance ranged from 50 nm to 300 nm.

* * * * *